United States Patent [19]

Jones

[11] Patent Number: 4,486,666

[45] Date of Patent: Dec. 4, 1984

[54] COUPLING DEVICES TO CONTAINERS FOR RADIOACTIVE MATERIAL

[75] Inventor: Edward L. Jones, Seascale, England

[73] Assignee: United Kingdom Atomic Energy Authority, London, England

[21] Appl. No.: 418,411

[22] Filed: Sep. 15, 1982

[30] Foreign Application Priority Data

Oct. 2, 1981 [GB] United Kingdom ............... 8129845

[51] Int. Cl.$^3$ .............................................. G21F 5/02
[52] U.S. Cl. ............................... 250/497.1; 250/506.1
[58] Field of Search .................. 250/496.1, 497.1, 506; 376/262

[56] References Cited

U.S. PATENT DOCUMENTS

| | | | |
|---|---|---|---|
| 3,593,594 | 7/1971 | Perry | 250/497.1 |
| 3,643,096 | 2/1972 | Jeffries et al. | 250/497.1 |
| 4,035,011 | 7/1977 | Gazda et al. | 294/86.18 |
| 4,066,909 | 1/1977 | Bourdois et al. | 250/497.1 |
| 4,281,252 | 7/1981 | Parsons et al. | 250/497.1 |

FOREIGN PATENT DOCUMENTS

| | | |
|---|---|---|
| 1233492 | 10/1960 | France . |
| 1095516 | 12/1967 | United Kingdom . |
| 1130928 | 10/1968 | United Kingdom . |
| 1204703 | 9/1970 | United Kingdom . |
| 1234020 | 6/1971 | United Kingdom . |

*Primary Examiner*—Bruce C. Anderson
*Attorney, Agent, or Firm*—William R. Hinds

[57] ABSTRACT

A container having a neck 15 is engageable at that neck with a hoist termination 40. The container is supported at the neck 15 by a ball latch 12 in a shielding flask 11 from which it can be lowered through the base of the flask. The termination 40 is provided with a ball latch releasing rod 51 and single-handed raisable and lowerable sleeve 43 which in the raised position allows engagement of the hoist termination 40 and container neck 15 at screw threads 28, 42 but prevents operation of the releasing rod 51 and in the lowered position allows operation of the release rod 51 but prevents disengagement of the hoist termination 40 and container neck 15.

4 Claims, 2 Drawing Figures

COUPLING DEVICES TO CONTAINERS FOR RADIOACTIVE MATERIAL

This invention relates to coupling devices to containers for radioactive material.

BACKGROUND OF THE INVENTION

In handling containers for radioactive material there is an inherent requirement for simplicity. Simplicity tends to enhance safety, gives greater scope for easy operations by remote controlled mechanisms, and where manual operation is required, gives a reduced contact period.

The present invention is concerned with hoisting necked containers in a shielding flask surrounding the container by a hoist termination which can engage and disengage the neck of the container to allow the container to be lowered through the base of the shielding flask.

The invention provides that a connection for such hoisting can only be made by following a correct and safe procedure and further provides that the hoisting connection once made, is locked in a manner such that it cannot be disconnected until again a correct procedure is followed.

SUMMARY OF THE INVENTION

The invention is stated as a coupling device to containers for radioactive material comprising a hoistable necked container in a shielding flask surrounding the container and a hoist termination which can engage and disengage the neck of the container to allow the container to be lowered through the base of the shielding flask, the container having a flask-engaging latch to provide axial restraint of the container in the flask and the hoist termination having a release device for the flask-engaging latch; characterised in that the hoist termination has an operable member which can be single handed located manually, either in an upper or lower position and, when in the upper position it permits engagement of the hoist termination with the container but prohibits operation of the release device for the flask-engaging latch until said operable member is lowered and when so lowered then prevents disengagement of the hoist termination until a reverse procedure is followed.

DESCRIPTION OF THE DRAWINGS

One form of the invention will now be described with reference to the accompanying drawings in which.

DESCRIPTION OF THE PREFERRED EMBODIMENT

Figure 1:
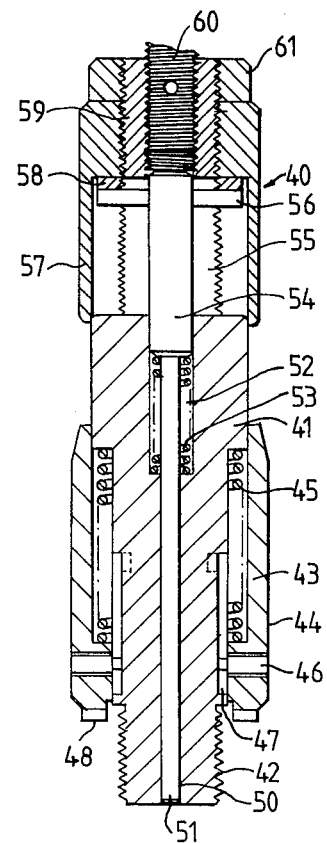
FIG. 1 is a diagram showing in sectional elevation a hoistable necked container latch-supported in a shielding flask.
Figure 1:
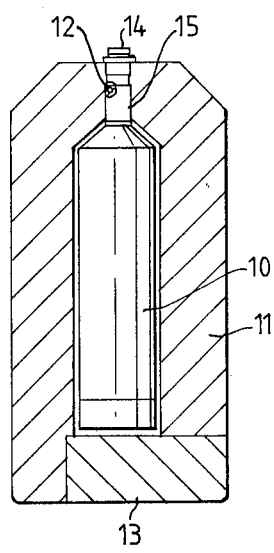

In FIG. 1 a bottom opening necked container 10 is shown latched and suspended in a shielding flask 11 at a flask-engaging ball latch 12. The flask 11 has a removable bottom cover 13 and a screwed cover 14 which engages the neck 15 of the container 10.

The operational requirements met by the invention are as follows:

1. The container 10 is to be axially restrained primarily by the ball latch 12 and secondarily by the cover 14 during transport and rotationally restrained by the external hexagonal profile on an end plug 25 engaging with the internal hexagonal bore 31 on an adaptor 29 secured to the flask 11.

2. The neck 15 of the container 10 can be engaged by a hoist termination.

3. The container 10 is not unlatched from the flask 11 until the engagement referred to in 2 above is secured.

4. The hoist termination is not disengagable from the neck 15 until the container is latched in its flask.

The means for achieving these operational requirements will not be described in detail with reference to FIG. 2.

Primary axial restraint of container 10 in flask 11 is obtained by a ball 20 of the ball latch 12 located in a bore 21 in the neck 15. The ball 20 is forced outwardly by a conical surface 22 on a plug 23 loaded by a spring 24 to engage the flask 11.

The neck 15 has the end plug 25 and this plug has a cruciform recess 26. The plug 25 is secured to the neck 15 by a locking pin 27. The plug 25 has a threaded bore 28 which is shown engaged by the screw cover 14 which abuts an adaptor 29 held by screws 30 to the top of the flask 11.

Figure 2:
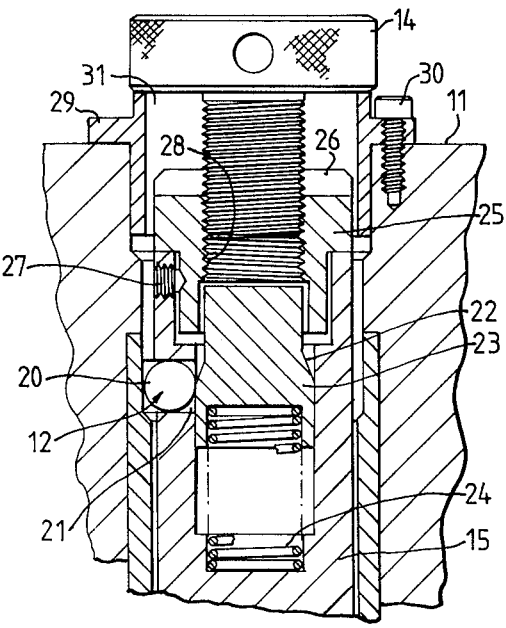
FIG. 2 shows, in larger scale than that of FIG. 1, a sectional elevation of a hoist termination approaching the neck of the container shown in FIG. 1.

The upper part of FIG. 2 shows a hoist termination 40. This has a main body 41 which terminates at its lower end with a threaded boss 42 which is capable of engaging the threaded bore 28 of the plug 25 in the neck 15 of the container 10, when the cover 14 has been removed.

The body 41 has around it a sleeve 43 with a hexagonal section outer surface 44 matched to engaged the hexagonal bore 31 of the adaptor 29. The sleeve 43 is slidable on the body 41 against the action of a spring 45. The movements of the sleeve 43 on the body 41 are defined by pins 46 in the sleeve engaged in a T-slot 47 on the body. In its uppermost position, the pins 46 and slot 47, allow the sleeve 43 to be rotated on the body 41 so that the sleeve is retained in the uppermost position. The lower end of sleeve 43 has teeth 48 which can engage the cruciform recess 26.

The body 41 has a bore 50 which accommodates a release plunger 51, for the flask-engaging ball latch 12, a bore 52 which accommodates a spring 53 which is loaded against a boss 54 of the plunger 51, and a slot 55 which accommodates a cross arm 56 on the boss 54. The cross arm 56 is acted on by a skirted nut 57, through a thrust washer 58. The nut 57 is threaded on a stem 59 of the body 41.

A winch cable 60 is shown connected with the body 41. A boss 61 is provided for rotating the body 41.

In use the following operations take place:

a. The screw cover 14 is removed.

b. The sleeve 43 is lifted and then rotated on the body 41 so that it is retained in a lifted position and, incidentally, this prevents rotation of the nut 57, so that the latch 12 cannot be incorrectly released.

c. The body 41 is lowered on the winch cable 60 so that the thread 42 can enter thread 28 on the neck of the container 10.

d. The body 41 is rotated at boss 61 so that thread 42 engages the thread 28 and the container 10 can then be supported by the winch cable 60 in readiness for release of the ball latch 12.

e. The sleeve 43 is rotated and lowered so that it enters the adaptor 29 and the teeth 48 are available to engage the recess 26. This has two effects. One effect is that the nut 57 is given freedom of downward movement for release of latch 12. The other effect is that the winch cable 60 and hoist termination 40 is stopped from rotating relative to the neck 15 of the container 10 and hence the container 10 cannot be inadvertently released from the hoist termination 40 and cable 60, either when the container is in the flask or is released from it.

f. The nut 57 is rotated to drive the plunger 51 on to the plug 23 of the ball latch 12 so that the ball 20 can retract and release the container 10 from the flask 11. At the same time the rotation of the nut prevents the raising of the operable member 43.

The container 10 can now be lowered through the base of the flask while suspended on the cable 60.

A reversal of the procedure described above can restore the container 10 to a secured position in the flask 11.

The form of the invention described above is amenable to single-hand operation. This is advantageous as the flask can be in places having restricted access.

The invention could be adapted for use with a horizontally orientated flask 11. In this situation push rods would be used in lieu of a cable.

I claim:

1. A coupling device to containers for radioactive material comprising a hoistable necked container in a shielding flask surrounding the container and a hoist termination which can engage and disengage the neck of the container to allow the container to be lowered through the base of the shielding flask, the container having a flask-engaging latch to provide axial restraint of the container in the flask and the hoist termination having a release device for the flask-engaging latch; characterised in that the hoist termination 40 has an operable member 43 which can be single-handed located manually either in an upper or lower position and, when in the upper position it permits engagement of the hoist termination 40 with the container 10 but prohibits operation of the release device 51 for the flask engaging latch 12 until said operable member 43 is lowered and when so lowered then permits operation of the release device but prevents disengagement of the hoist termination 40 until a reverse procedure is followed.

2. The combination as claimed in claim 1 characterised in that the container and flask have means (25,31) providing mutual rotational restraint.

3. The combination as claimed in claim 2 characterised in that said operable member 43 has means (46,47) restraining it from rotation on the hoist termination in its lowermost position and has first means (44) preventing rotation together with the hoist termination when said termination and member are both in the flask 11 and second means 48 preventing rotation together with hoist termination when the container is lowered from the flask.

4. The combination as claimed in claim 2 characterised in that said operable member 43, on a location in its lowermost position, permits rotation of a nut 57 to drive a member 51 to release said latch 12 and at the same time locks the hoist termination to the container 10 and the rotation of the nut at the same time prevents the raising of said operable member to its uppermost position.

* * * * *